(12) United States Patent
Cotton et al.

(10) Patent No.: US 8,325,631 B2
(45) Date of Patent: Dec. 4, 2012

(54) SYSTEM AND METHOD FOR EXTENDING DSL TRANSMISSION RANGE

(75) Inventors: John Michael Cotton, Rochester, NY (US); Robert Alan Macaluso, Webster, NY (US); Perlis Joseph Trahan, Ontario, NY (US); Neil C. Olsen, Milford, CT (US); Douglas R. Milliman, Baldwinsville, NY (US)

(73) Assignee: Generonix, Inc., Rochester, NY (US)

( * ) Notice: Subject to any disclaimer, the term of this patent is extended or adjusted under 35 U.S.C. 154(b) by 618 days.

(21) Appl. No.: 11/726,137

(22) Filed: Mar. 20, 2007

(65) Prior Publication Data

US 2009/0067451 A1 Mar. 12, 2009

Related U.S. Application Data

(60) Provisional application No. 60/784,887, filed on Mar. 21, 2006.

(51) Int. Cl.
*H04B 7/005* (2006.01)
(52) U.S. Cl. ........ 370/278; 370/279; 370/293; 370/359; 370/360; 370/401
(58) Field of Classification Search .................. 370/278, 370/279, 293, 359, 360, 394
See application file for complete search history.

(56) References Cited

U.S. PATENT DOCUMENTS

| | | | | |
|---|---|---|---|---|
| 4,280,193 A | * | 7/1981 | Baun et al. | 710/64 |
| 5,594,736 A | * | 1/1997 | Tatsumi et al. | 370/474 |
| 5,854,786 A | * | 12/1998 | Henderson et al. | 370/335 |
| 5,862,128 A | * | 1/1999 | Cooperman et al. | 370/236 |
| 6,829,292 B1 | * | 12/2004 | Shenoi | 375/211 |
| 6,973,039 B2 | * | 12/2005 | Redi et al. | 370/238 |
| 7,039,048 B1 | * | 5/2006 | Monta et al. | 370/389 |
| 7,151,934 B2 | * | 12/2006 | Nishimura et al. | 455/442 |
| 7,194,023 B2 | * | 3/2007 | Norrell et al. | 375/222 |
| 7,257,220 B1 | * | 8/2007 | Marshall et al. | 379/339 |
| 7,310,135 B2 | * | 12/2007 | Wisseman | 356/73.1 |
| 7,664,115 B1 | * | 2/2010 | Robotham | 370/395.43 |
| 2003/0196210 A1 | * | 10/2003 | Alves | 725/126 |
| 2003/0198232 A1 | * | 10/2003 | Denton | 370/395.52 |
| 2004/0017848 A1 | * | 1/2004 | Doan et al. | 375/222 |
| 2008/0205006 A1 | * | 8/2008 | Fursich et al. | 361/726 |

OTHER PUBLICATIONS

Notification of Transmittal of International Search Report and Written Opinion of the International Searching Authority, International Search Report and Written Opinion of the International Searching Authority Mailed Sep. 3, 2008.

* cited by examiner

*Primary Examiner* — Bo Hui A Zhu
(74) *Attorney, Agent, or Firm* — Crowell & Moring LLP (57) ABSTRACT

A system and method is provided to extend transmission range of a digital subscriber line (DSL). In one embodiment, a method includes receiving an input signal including a broadband data signal having a first signal strength and a telecommunication signal. The broadband data signal may be separated from the telecommunication signal. The broadband data corresponding to the broadband data signal may be regenerated, wherein the regenerated broadband data signal has a second signal strength which is greater than the first signal strength according to an embodiment of the invention. According to another aspect of the invention, the regenerated broadband data signal may be merged with the telecommunication signal into an output signal and the output signal may be transmitted over a subscriber line.

46 Claims, 8 Drawing Sheets

SYSTEM AND METHOD FOR EXTENDING DSL TRANSMISSION RANGE

CROSS REFERENCE TO RELATED APPLICATION

This application claims priority to U.S. Provisional Patent Application Ser. No. 60/784,887 filed on Mar. 21, 2006.

FIELD OF THE INVENTION

The present invention relates generally to a broadband DSL repeater system and method for extending transmission range for various forms of DSL.

BACKGROUND

Local Exchange Carriers (LECs) currently face increased competition from Cable TV companies offering high speed Internet access and IP phones, as well as wireless carriers offering mobile phone and broadband service. Recent advances in the technology of transmitting broadband signals over copper wire pairs, generally referred to as "digital subscriber line" (DSL) has presented the opportunity for the LECs to offer new revenue generating services comparable to the Cable companies, in addition to reducing their operating costs. High speed Internet service is available through the deployment of ADSL and new versions of DSL with higher bandwidth allow the LECs to compete with the CATV companies without the need to completely replace their copper networks with more expensive technologies such as fiber to the home.

New DSL technologies, (e.g., ADSL2+ and VDSL2) allow for transmission of up to 100 Mbps over the standard telephone pairs, which is enough to provide high speed Internet Access and multiple channels of video. However, broadband transmissions are quickly attenuated when transmitted over the phone lines, and are only good for relatively short distances. Due to this attenuation of the new broadband signals over copper pairs, full service would be limited to subscribers who are less than a mile from the central office (CO). There exists a need to extend broadband service over existing copper networks over greater distances without replacing the existing copper network.

The use of optical fiber to extend range has been suggested. Services can be transmitted over optical fiber from a central exchange to new remote access nodes or digital loop carriers (DLCs) installed in neighborhood "pedestals" at distances of 1 to 2 or more miles from the CO. However this strategy would be expensive to implement, and require substantial modifications to existing networks.

Thus there is a need for an improved solution to extend the broadband service transmission range limits using the existing telephone infrastructure.

BRIEF SUMMARY OF THE INVENTION

Disclosed and claimed herein are systems and methods to extend transmission range of a digital subscriber line (DSL). In one embodiment, a method includes receiving an input signal including a broadband data signal having a first signal strength and a telecommunication signal. The broadband data signal may be separated from the telecommunication signal. The broadband data corresponding to the broadband data signal may be regenerated, wherein the regenerated broadband data signal has a second signal strength which is greater than said first signal strength according to an embodiment of the invention. According to another aspect of the invention, the regenerated broadband data signal may be merged with the telecommunication signal into an output signal and the output signal may be transmitted over a subscriber line.

Other aspects, features, and techniques of the invention will be apparent to one skilled in the relevant art in view of the following detailed description of the invention.

DETAILED DESCRIPTION OF EXEMPLARY EMBODIMENTS

One aspect of the present invention is to provide a broadband DSL repeater, able to extend transmission range of broadband data at acceptable rates. In one embodiment, broadband data signal transmitted over copper line pairs together with telecommunication signals (e.g., plain old telephone service (POTS), voice service) may be received, the broadband data signal may also be separated from the telecommunication signal and the original broadband data signal strength of the received signal may be regenerated to full strength signal levels. According to another embodiment, error correction features of the broadband transmission may be used to recreate the original broadband data signal. According to an additional embodiment, the recreated broadband data signal may be merged together with the original corresponding telecommunication signal. Forward error correction encoding, may be added to the recreated broadband data signal. The combined signals may be transmitted further distances, thus increasing the range of the original broadband services. Thus, further range extension may be achieved on existing LEC infrastructure with equipment placed at appropriate intervals along a copper path to the destination subscriber. According to one of more aspects of the invention, one or more of ADSL, ADSL2+, VDSL, VDSL2, HDSL, SDSL and a DSL technology may be supported by the DSL repeater.

According to another aspect of the invention, one or more high data rate paths may be utilized to distribute the broadband data signal over many lower rate copper paths for longer distance low loss transmission after separation from a corresponding telecommunication signal. The data streams may be recombined into the original one or more high data rate data streams according to one embodiment of the invention.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, etc. The code segments may be downloaded via computer networks such as the Internet, Intranet, etc.

Figure 1:
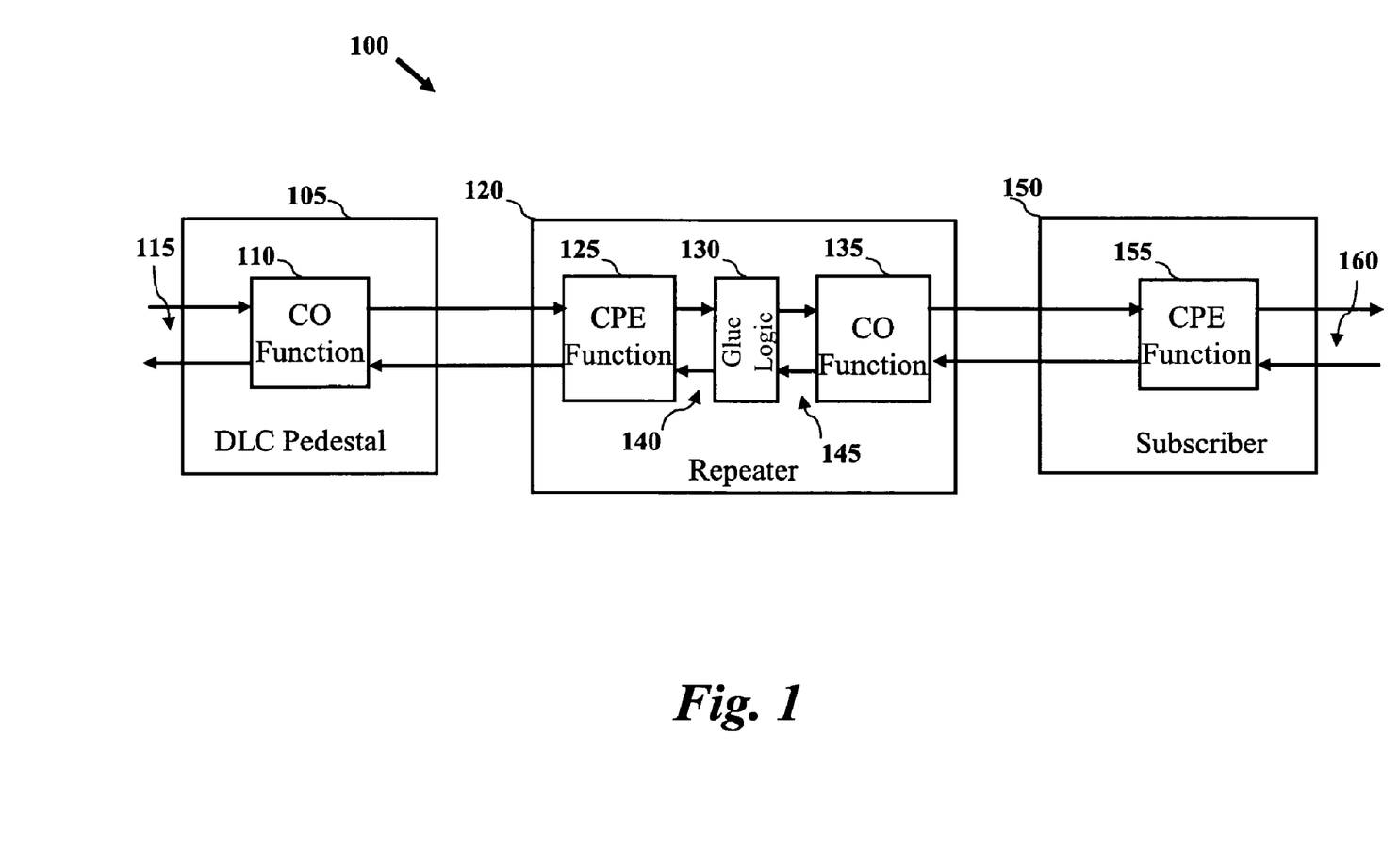
FIG. 1 depicts embodiments of a simplified system diagram of one or more aspects of the invention.

Referring now to the drawings, an exemplary embodiment according to one or more aspects of the invention is depicted in FIG. 1. System 100 depicts a general system able to extend the range over which the broadband data signal may be transmitted. In one embodiment, system 100 may include a digital loop carrier (DLC) pedestal 105, repeater 120 and subscriber block 150. Repeater 120 may be placed at a point between DLC pedestal 105 and subscriber block 150 such that a DSL signal may be recreated to original signal strength.

In one embodiment, DLC pedestal 105 may include central office function (CO) 110 configured to receive DSL signal 115 containing a broadband data signal and telecommunications service. The CO function 110 may negotiate an optimum transfer rate of data distribution with a corresponding customer premise equipment function (e.g., CPE 125) of a repeater (e.g., repeater 120).

According to another embodiment of the invention, repeater 120 may include a CPE function 125, glue logic 130 and CO function 135. CPE function 125 of the repeater 120 may receive a transmitted signal, demodulate the transmitted signal, and apply error correction algorithms to recover original data from the received signal. CO function 135 may apply error correction encoding to the signal, re-modulate the signal and send the signal to a subscribers CPE equipment (e.g., subscriber device 150). Repeater 120 may also perform a reverse operation for transmitting signals in the up direction to the DLC pedestal 105. Subscriber device 150 may include CPE function 155 and provide broadband service through connection 160. According to a further embodiment of the invention, a maximum data rate may be established between repeater 120 and DLC pedestal 105, and repeater 120 and the subscriber device 150. The maximum data rate may be determined by the lowest capacity path, or a limitation imposed by system specifications.

In one embodiment of the invention, repeater 120 may include a single port CPE function 125 feeding a single port CO function 135. A two port CO chip set may be configured to use only one of the ports and idle the other to provide a single port CO function 135. According to certain aspects of the invention, a multi-port CO function may be fed by multiple single port CPEs.

According to an additional embodiment of the invention, CPE function 125 may contain, in various configurations depending on particular vendor designs, one or more of a line driver, hybrid function for separating downstream and upstream data flows, an analog front end, an analog-to-digital converter for down stream transmissions, a digital-to-analog converter for up stream transmissions, message regeneration using error correction computation, message assembly and buffering functions, and a type I Universal Testing Operation Interface for Asynchronous Transfer Mode (Utopia) interface towards a glue logic function (e.g., glue logic function 130).

According to yet another embodiment of the invention, repeater 120 may include a glue logic function 130. Glue logic function 130 may consist of an 8 bit to 16 bit and/or a type I to type II Utopia interface conversion. In one embodiment of the invention, glue logic function 130 may include message buffering and clock conversion.

In one embodiment of the invention, CO function 135 may provide one or more of IP address recognition, virtual connection management, computation of error correction code generation, hybrid function for separating downstream and upstream data flows, an analog front end, an analog-to-digital converter for down stream transmissions, a digital-to-analog converter for up stream transmissions, message regeneration using error correction computation, S-ram memory, message assembly and buffering functions, and a type I Utopia interface towards the glue logic (e.g., glue logic 130). The CO function 135 may be followed by a high pass filter to prevent interference from an ongoing POTS signal. According to another embodiment of the invention, CO function 135 may also provide an access control logic function.

Repeater 120 may also include interfaces 140 and 145 for connecting and managing signaling of available data and data requests. In one embodiment, interface 140 may correspond to an Asynchronous Transfer Mode (ATM) or Ethernet interface. Interface 140 may also provide transferring IP format data over ATM and converting Ethernet data into ATM format. Using ATM, interface 145 may be defined as a Utopia II Physical (PHY) interface. A Utopia I interface provides a single channel interface between an ATM device and its physical data source (or sink). A Utopia II interface, which may be provided between an ATM device and multiple physical channels of data, may be used to provide an address bus to select a source or destination data channel. There are several different approved methods of connecting and managing the signaling of available data, and data requests.

Figure 2:
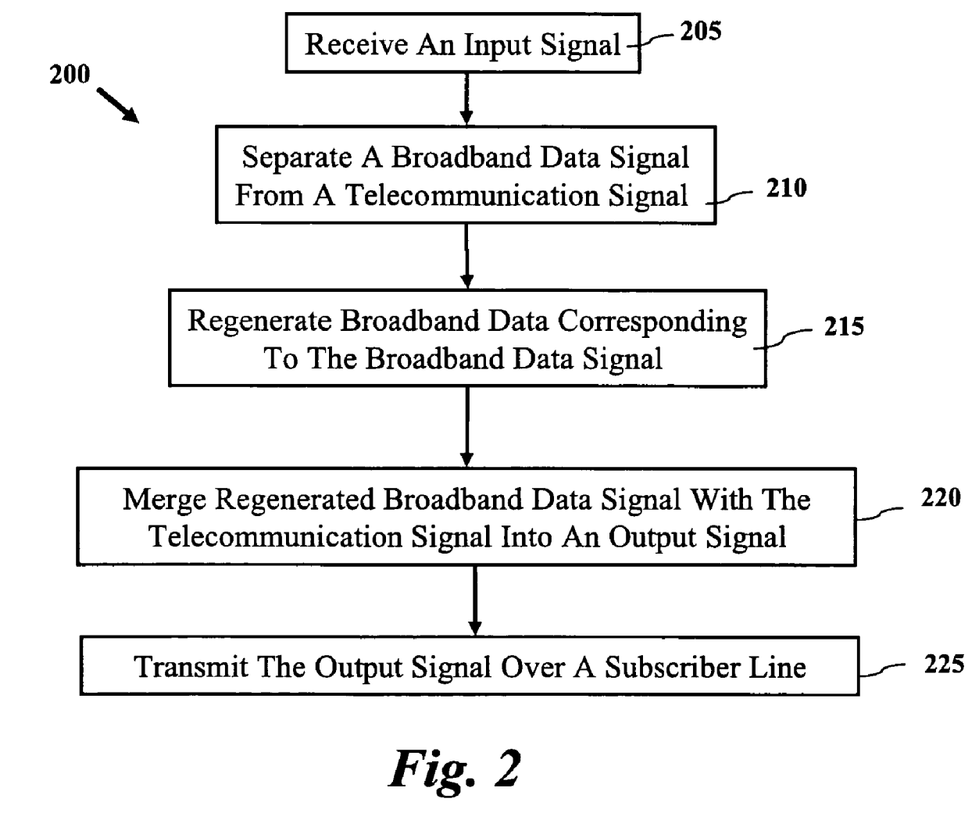
FIG. 2 illustrates a repeater procedure capable of carrying out one or more aspects of the invention.

As depicted in FIG. 2, a process 200 is provided to extend transmission range of a digital subscriber line. Process 200 is initiated by block 205 when an input signal including a broadband data signal having a first signal strength is received. In one embodiment of the invention, the broadband data signal may also include a telecommunication signal. The input signal may be embedded in a subscriber line (e.g., subscriber line 310 of FIG. 3) transmitted from a DLC pedestal (e.g., DLC pedestal 105). Process 200 may continue with block 210 wherein the broadband data signal is separated from the telecommunication signal if present. In one embodiment of the invention, a high pass filter (HPF) may be used to separate a broadband data signal from the input signal. According to another embodiment of the invention, a low pass filter (LPF) may be used to separate a telecommunication signal from the input signal. In block 215, broadband data corresponding to broadband data from the broadband data signal is regenerated, wherein said regenerated broadband data signal has a second signal strength which is greater than the first signal strength. In one embodiment of the invention, the regenerating broadband data signal may include amplifying the broadband data signal to the original signal strength. Broadband data signals may be regenerated using error correction encoding according to one aspect of the invention. According to certain aspects of the invention, a CPE function may be used to regenerate broadband data. In block 220 of process 200, the regenerated broadband data signal may be merged with the original telecommunication signal if present. In one embodiment of the invention, a switch matrix may be used to merge recreated broadband data with a telecommunication signal. According to certain aspects of the invention, a HPF may be utilized prior to merging of the regenerated broadband data signal to prevent interference from telecommunication signals. Block 225 of process 200 provides transmitting of the output signal over a subscriber line (e.g., subscriber line 160).

Figure 3:
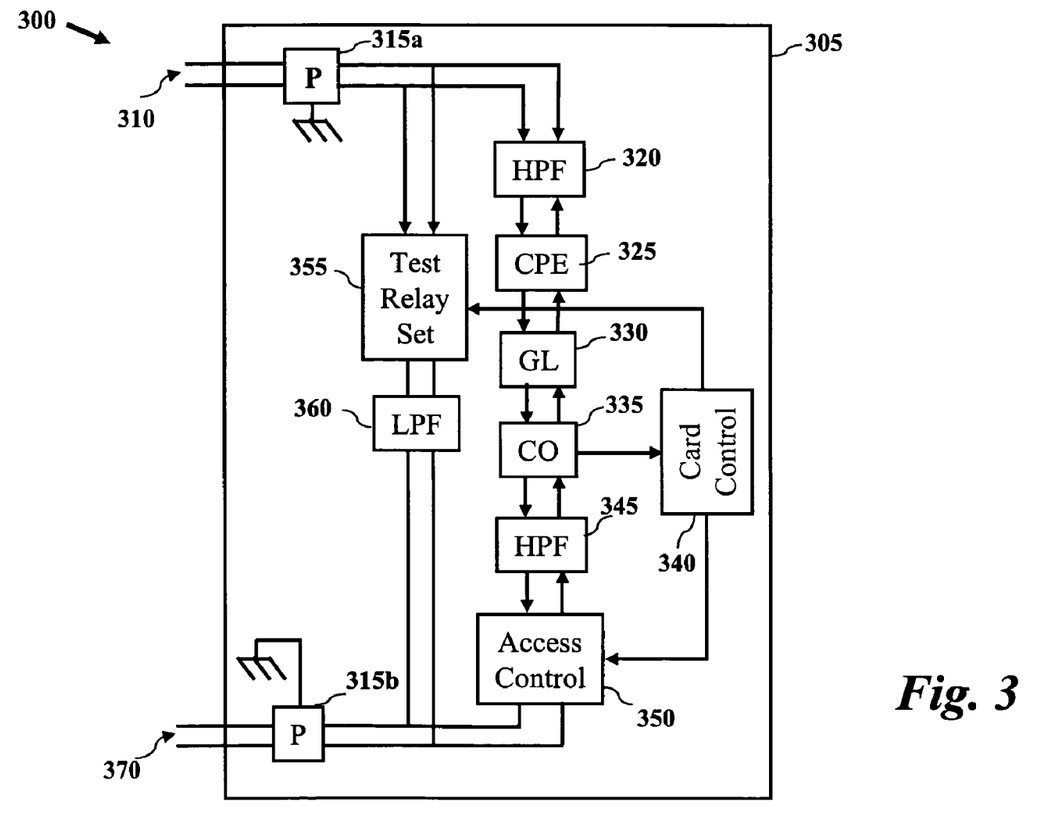
FIG. 3 depicts embodiments of a repeater according to one or more aspects of the invention.

Referring to FIG. 3, an exemplary view 300 of a single line repeater 305 is depicted according to one or more aspects of the invention. In one embodiment, single line repeater 300 may be configured as a single line repeater PCB card. The single line repeater 305 may receive a subscriber line 310 and may include an over voltage and lightning protection circuit 315a-b according to one embodiment of the invention. Repeater 305 may include HPF 320, CPE function 325, glue logic 330, CO function 335, HPF 345 and an access control relay set 350. Repeater 305 may also include card control function 340 for control of repeater 305 and to provide control signals to access control relay set 350. According to another embodiment, repeater 305 may also include test relay set 355 and LPF 360. Test relay set 355 may determine connection from repeater 305 to a subscriber. In one embodiment of the invention, test relay set 355 may be used to identify the location of a fault in relation to the repeater. According to another aspect of the invention, a control microprocessor (e.g., card control function 340) may activate test relay set 355, which may disconnect the repeater from a subscriber leg of the connection and provide an open loop simulation back to the tester. The open loop simulation may simulate an on-hook subscriber. According to one aspect of the invention, test relay set 355 may be used to identify one or more of a fault between the central telephone installation and repeater 305, and a fault between repeater 305 and a subscriber based on the open loop simulation. LPF 360 may be utilized to separate a telecommunications signal from subscriber line 310. Incoming subscriber line pair 310 and outgoing subscriber line pair 370 may be attached to a PCB (Printed Circuit Board) connector socket on a backplane. According to certain aspects of the invention, input pairs may also be connected to the output pair at a PCB socket by means of a "cut through" connection provided by a plug-in PCB for subscribers that do not require a broadband data signal.

Figure 4:
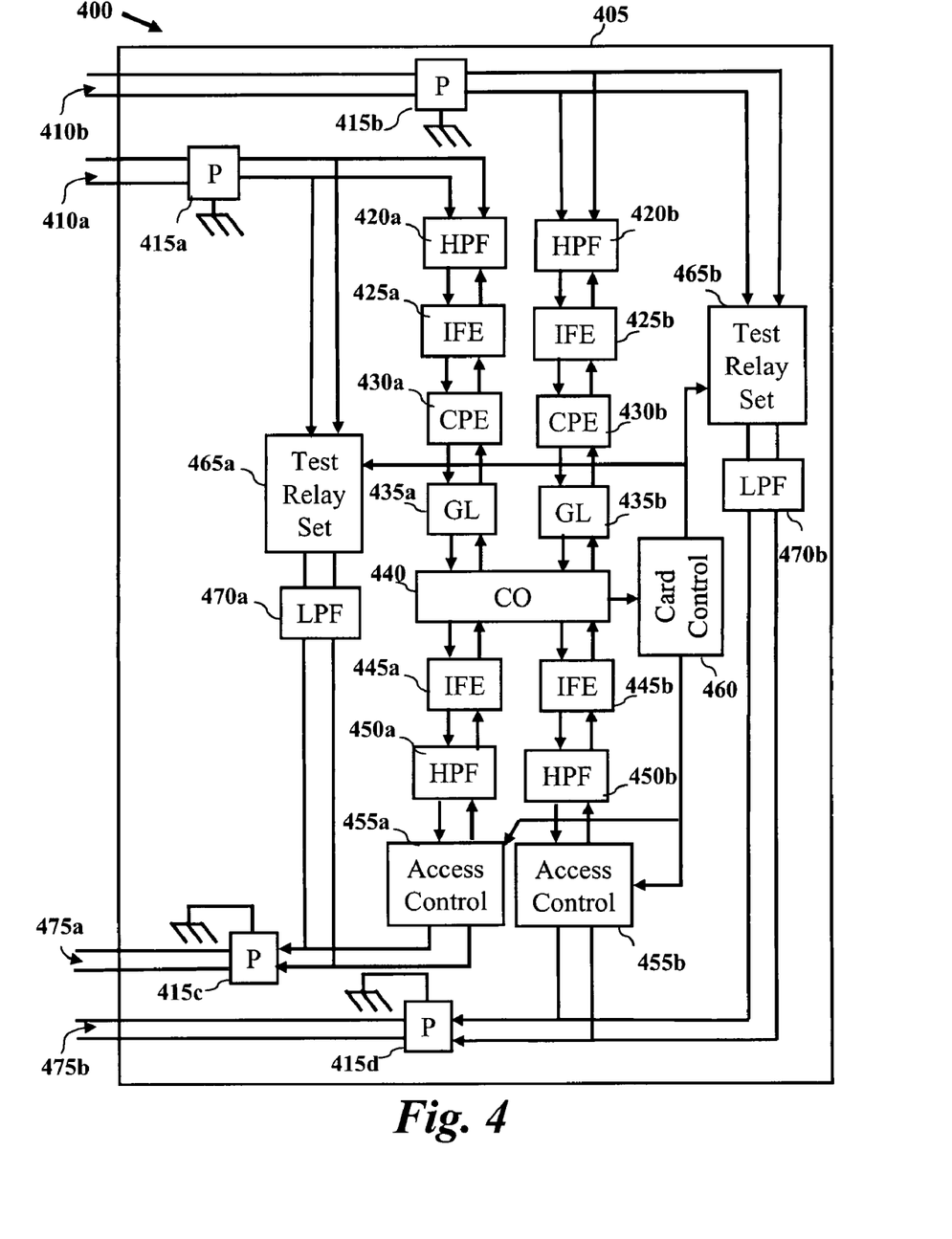
FIG. 4 depicts embodiments of a repeater according to one or more aspects of the invention.

Referring to FIG. 4, an exemplary view 400 of a two-line repeater 405 is depicted according to one or more aspects of the invention. Two-line repeater 405 may be suitable for xDSL chip sets that support two lines with their CO function. Two-line repeater 405 may also be useful when the data transmission capacity of a subscriber connection is increased by using two pairs of lines as a bonded pair. The repeater 405 is essentially two of a single repeater (e.g., repeater 305), with the exception that there may be a single CO function serving two lines. Repeater 405 may include HPFs 420a-b, integrated front ends (IFE) 425a-b, CPE functions 430a-b; glue logic functions 435a-b, CO function 440, IFE functions 445a-b, HPFs 450a-b and access control relay sets 455a-b. Repeater 405 may also include card control function 460 for control of the repeater 405, and to provide control signals to access control relay set 455 and test relay sets 465a-b. Repeater 405 may also include over voltage and lightning protection circuits 415a-d and LPFs 470a-b. According to one embodiment of the invention, the CO function 440 may use a type II or higher Utopia interface, and the glue logic 435a-b may additionally need to convert between a type I Utopia interface with CPE 430a-b to a type II interface with CO 440. IFEs 425a-b may provide one or more of a line driver, hybrid function for separating downstream and upstream data flows, an analog front end, an analog-to-digital converter for down stream transmissions and a digital-to-analog converter for up stream transmissions. Access control relay logic 455 may be provided to disable broadband operation, without requiring technician intervention, if a subscriber changes requirements of a corresponding subscriber line. Outgoing line pairs 470a-b may be attached to a PCB connector socket on a backplane according to another embodiment of the invention.

According to another embodiment of the invention, commands to activate the test relay sets 465a-b and access control logic relays 455a-b, are sent over the same broadband connection as used by the subscriber, but to a different IP address which is assigned to local control messages. These local control messages may be sent from the CO function 440 to a control microprocessor provided by card control device 460 over a communication interface, which may be one of a number of possible interfaces corresponding to the particular CO function 440. The local control messages may be implemented by the control microprocessor provided by card control device 460.

In certain embodiments, a two line repeater card is installed because one of the line pairs may require broadband service. The access control function 445 of an unused line may be set to a disconnect position to deny any accidental access to broadband service. The relay function may also be set in a connect position as soon as a subscriber assigned to that line requires broadband service, without the need for technician intervention.

According to another embodiment of the invention, cable pairs for POTS connections are routinely tested from a central telephony installation by means of an automated line test machine. If a fault is identified, the location of the fault to either the connection from the central telephony installation to the repeater (e.g., repeater 405), or the connection from the repeater (e.g., repeater 405) to a subscriber may be determined by means of a test relay set (e.g., test relay set 465a-b). In one embodiment, a command from a control microprocessor provided by card control device 460, may disconnect a repeater-to-subscriber leg of a connection and provide an open loop back to the tester. The aforementioned test may simulate an on-hook subscriber and allow faults to be isolated to either side of the repeater.

According to another embodiment of the invention, a control microprocessor provided by card control device 460 may be responsible for local equipment management functions, setting configuration management parameters required by the xDSL protocols based on LEC preferences and the distance from DLC pedestals, software testing and reload, and setting up and tearing down virtual ATM connections in the equipment.

Figure 5:
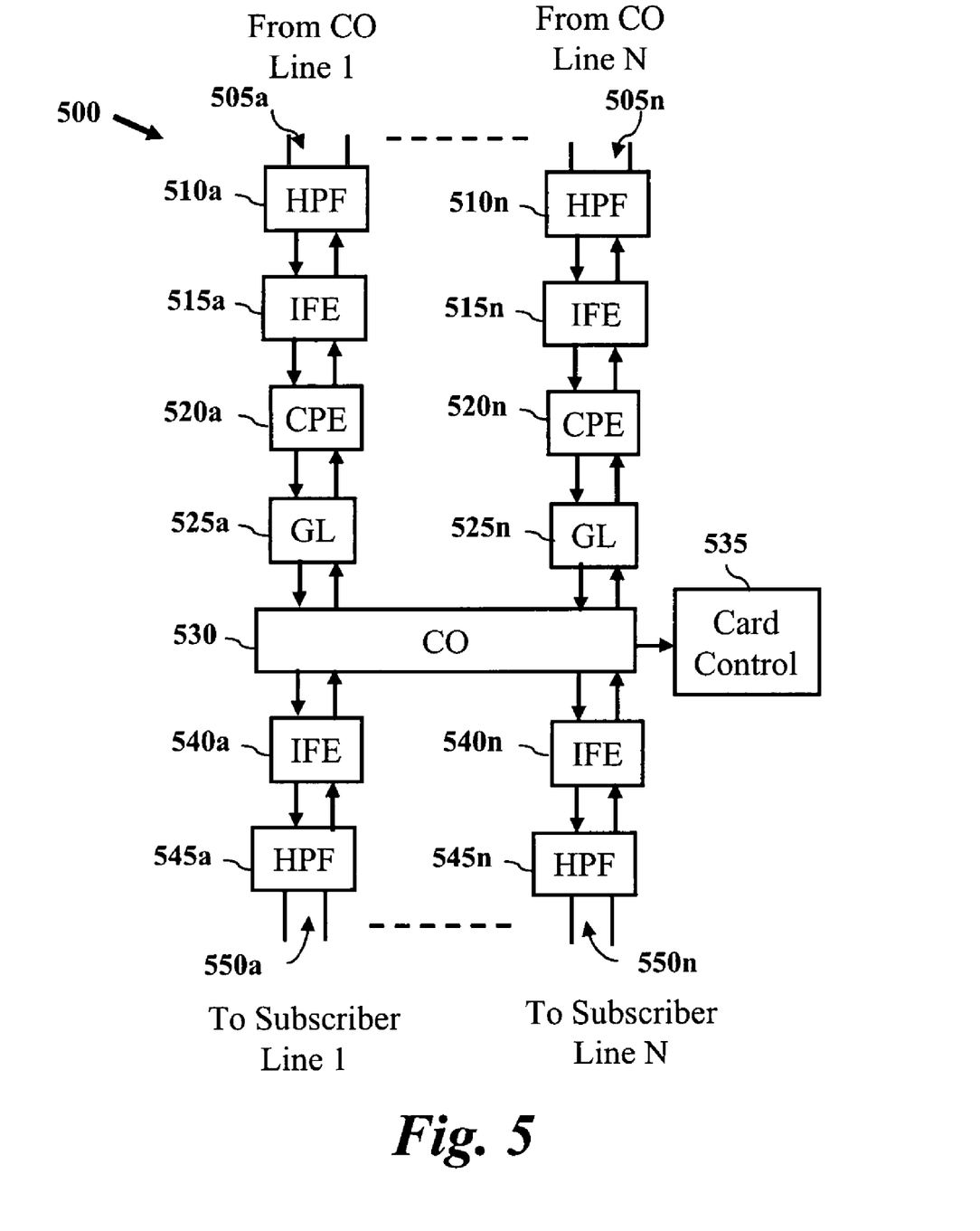
FIG. 5 depicts embodiments of a repeater according to one or more aspects of the invention.

Referring to FIG. 5, a multiple port repeater system 500 is depicted according to one or more aspects of the invention. System 500 may include a multi-port CO function 530 fed by multiple single port CPEs 520*a-n*. Similar to a two-line repeater (e.g., two line repeater 405), multiple port repeater system 500 may include HPFs 510*a-n*, IFEs 515*a-n*, CPE functions 520*a-n*, glue logic functions 525*a-n*, CO function 530, IFE functions 540*a-n* and high pass filters 545*a-n* according to one embodiment of the invention. Multiple port repeater system 500 may include card control function 535.

Figure 6A:
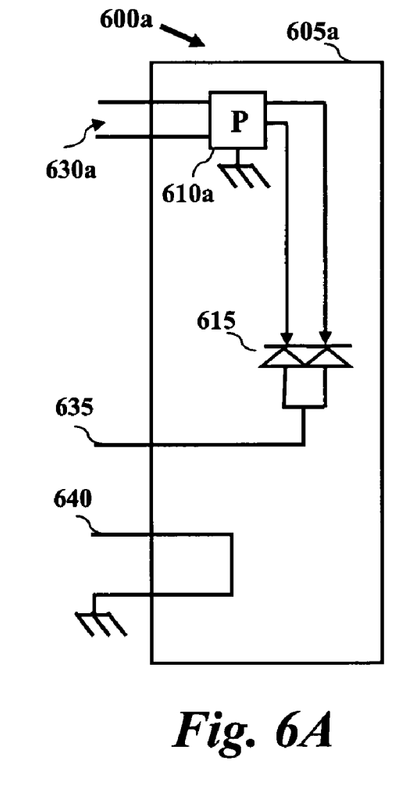
FIGS. 6A-C depict embodiments of power functions of one or more aspects of the invention.
Figure 6B:
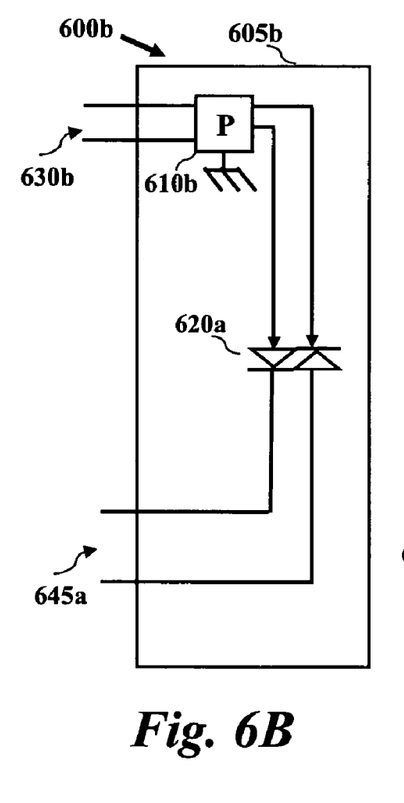
Figure 6C:
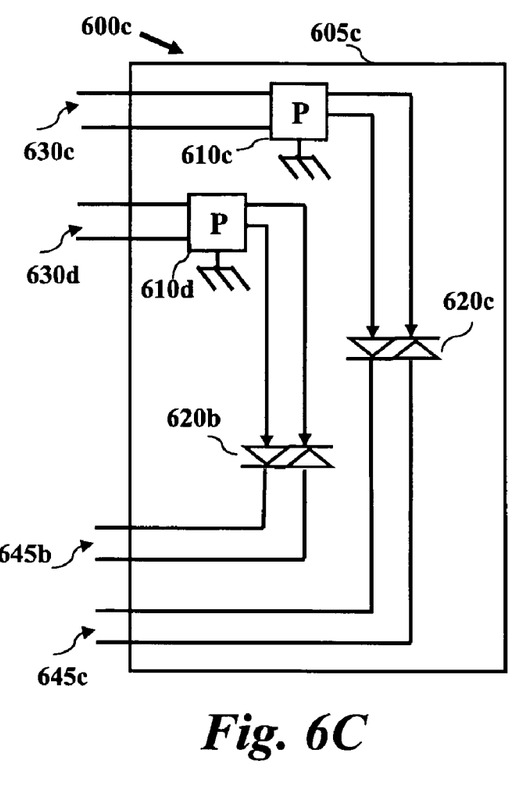

As depicted in FIGS. 6A-C, exemplary views of power options are provided according to one or more aspects of the invention. According to one embodiment of the invention, a repeater backplane and its installed PCB cards require DC power for operation. According to certain aspects of the invention, a repeater (e.g., repeater 120) may be powered by one or more of a local 120-240 volt AC power, central office power (−48 volt) using spare copper pairs, derived power from CO power and local −48 volt DC power allowing for standard battery backup using industry standard power supplies.

In one embodiment of the invention, a DC power source may be provided by transformer/rectifier circuits, when backup power is not required for data service, by converting a 220-240 volt AC voltage supply to −24 or −48 Volts DC. According to another embodiment of the invention, a battery may be incorporated to provide uninterrupted broadband service during power outages. According to an other embodiment of the invention, a repeater (e.g., repeater 120) may default to a cut through line and operate as a normal POTS line to provide voice only service to a subscriber during a power outage or periods when a repeater is not provided with power.

Another power option according to one embodiment of the invention, is to provide CO supplied −48 volt line power. Referring to FIG. 6A, a repeater power supply 605*a* may be provided with a −48 volt supply 635 by using 3 or 5 power server pairs with both legs 630*a* connected to the CO or DLC −48 volt supply. A ground return 640 may be provided by an adequate grounding stake. This embodiment may particularly be suitable for when high speed Internet service and/or video service is expected to be low. Selected lines may be connected to the supply power layer in the backplane through diodes 615. This supply power plane will be connected to ground by a suitably large capacitor. Repeater power supply 605*a* may include an over voltage and lightning protection circuit 610*a*.

According to another embodiment of the invention, a derived power system is provided. Referring to FIG. 6B, a repeater power transfer card 605*b* may receive the input line voltage 630*b* which has been raised by electronic means to a higher voltage (e.g., ±190 volts) at the DLC or central exchange. At the repeater power supply, the ±190 volt supply may be converted back to −48 volts DC. The power delivered at the repeater end may be regulated to a constant 65 watts of power at −48 volt DC from a remote power unit. Any set of power pairs may be selected for this power transfer, and connected to the supply power layers in the backplane with lines 645*a*. Selected lines may be connected to the supply power layer in the backplane through diodes 620*a*. Repeater power transfer card 605*b* may include an over voltage and lightning protection circuit 610*b*. Referring to FIG. 6C, a repeater power transfer card 605*c* contains two sets of power pairs selected for power transfer and connected to the input supply power layers in the backplane with lines 630*c-d*. Selected lines may be connected to the supply power layer in the backplane through diodes 620*b-c* Repeater power transfer card 605*c* may include an over voltage and lightning protection circuit 610*c-d*.

Another power option according to one embodiment of the invention, is to provide a direct −48 volt CO power. In some circumstances the pedestal may be placed next to the CO or DLC, in which case direct connection to the local −48 volt supply by means of a power cable will form the least expensive and most effective power scheme of all.

Figure 7:
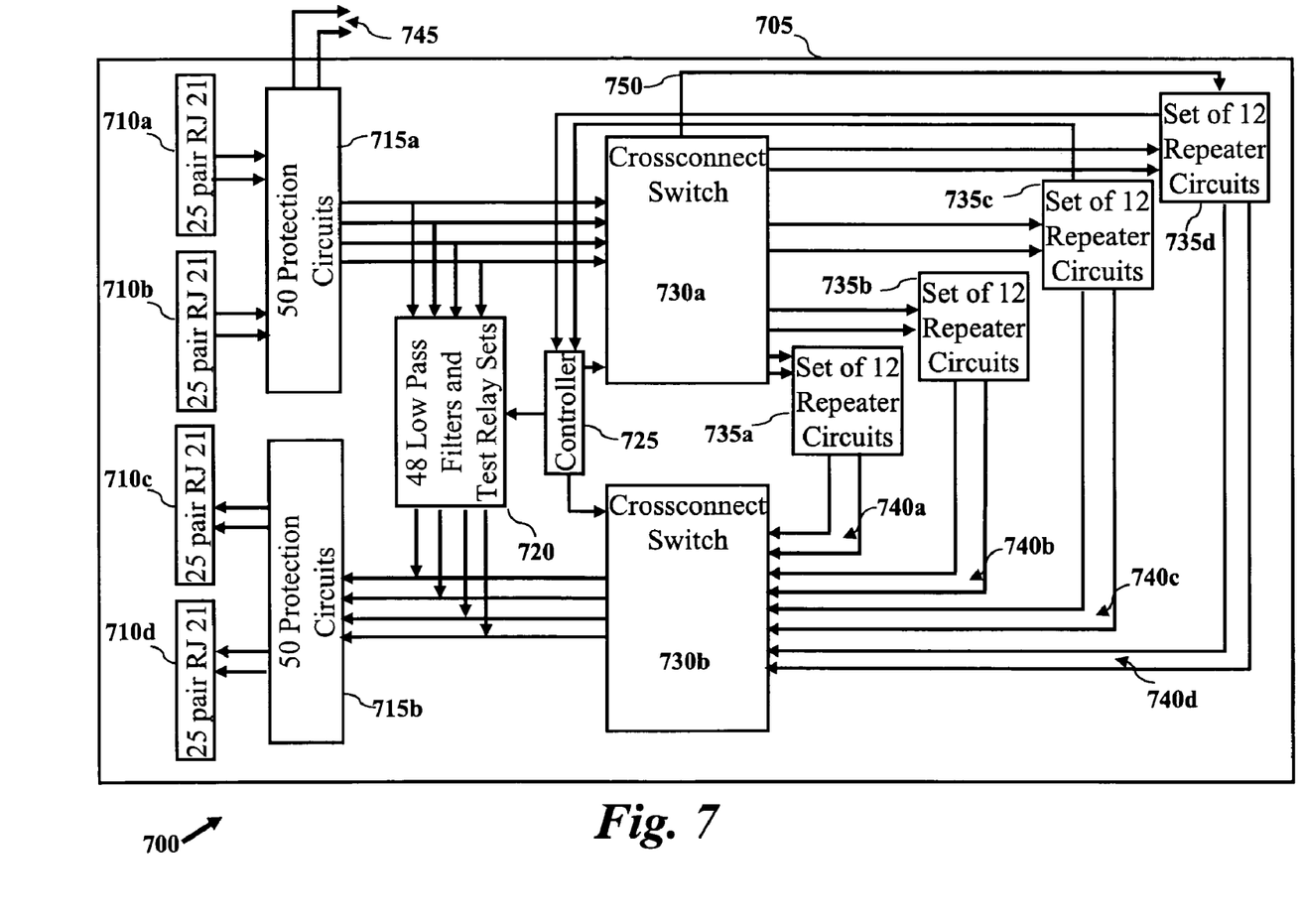
FIG. 7 depicts embodiments of a repeater according to one or more aspects of the invention.

Referring to FIG. 7, an exemplary view 700 of a 48 pair repeater 705 is provided according to one or more aspects of the invention. Repeater 705 corresponds to a CO function that is able to service more than two repeater functions. According to one embodiment of the invention, a CO function serving 4, 6, 8, or 12 lines, allows for a system serving sets of 12, 24, or 48 lines. FIG. 7 provides a 48 line repeater system 705, using four 12 pair CO functions 735*a-d* connected by four sets of 12 line pairs 740*a-d*. System 705 may include incoming line connections 710*a-b*, outgoing line connections 710*c-d*, protection circuits 715*a-b* (e.g. protection circuit 315*a*), LPFs 720 and power circuit connections 745. In one embodiment of the invention, cross connect switch functions 730*a-b* may allow connection of any incoming line to any free repeater function 735*a-d*. A 48 line unit with 24 or less broadband subscribers may use two broadband repeater cards, with two 48×24 switches (e.g., cross connect switch 730*a-b*), one for incoming broadband data signals, and one for the outgoing regenerated broadband data signals. Providing an additional number of repeater function cards and additional switching capability of the cross connect cards may provide a certain level of fault tolerance of the repeater capability. According to one embodiment of the invention, relay switches may be employed by double pole double throw relays (DPDT). Control microprocessor 725, may respond to control messages received by the CO functions of the first two repeater cards to be installed. These messages will be sent to an IP address assigned for local control of the repeater operation and the cross connect switches according to one embodiment of the invention.

In one embodiment of the invention, an initialization path 750 may be provided to establish connection between one or more inputs to the cross connect switch 730*a* and CO functions of the first two repeater cards 735*d*. Broadband local control messages may be received independently of paths set across the cross connect switches and the initialization paths may be disconnected once there are active broadband connections established. According to an additional embodiment of the invention, cross connect switches 730*a-b* may provide functions associated with access control relays (e.g., access control relays 455*a-b*).

Figure 8:
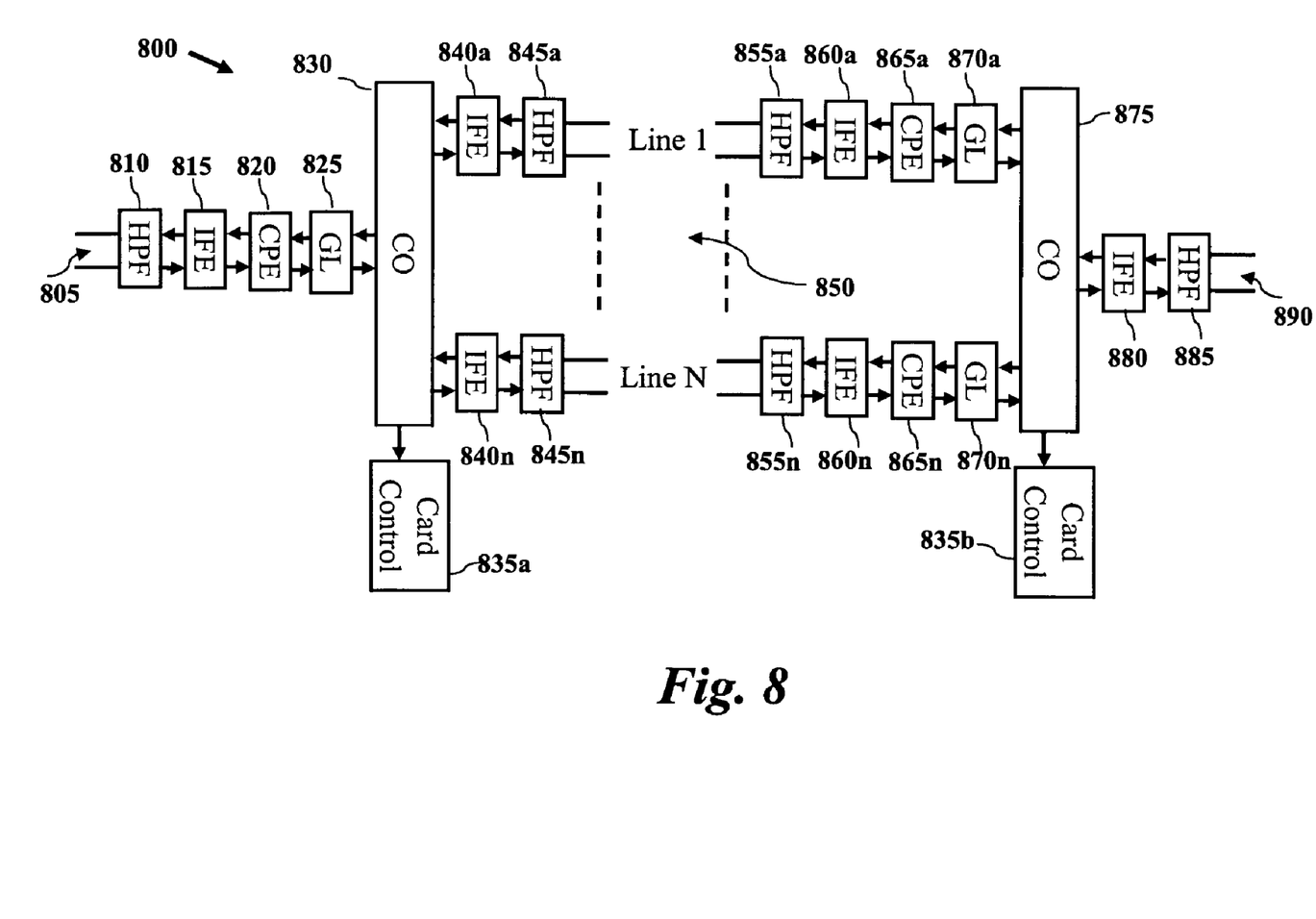
FIG. 8 depicts embodiments of a simplified system diagram of one or more aspects of the invention.

Referring to FIG. 8, a repeater system 800 is depicted according to one or more aspects of the invention. System 800 may provide one or more high data rate paths which may be utilized to distribute broadband data signals over many lower rate copper paths for longer distance low loss transmission after separation from corresponding telecommunication signals. System 800 may also recombine the data streams into the original one or more high data rate data streams according to one embodiment of the invention. In one embodiment of the invention, two repeater functions are provided in tandem which may then provide between 2 and 12 selectable parallel paths for each broadband signal. In another embodiment of the invention the DLC pedestal may provide one or more bonded pairs each resulting in two parallel paths.

According to an additional embodiment of the invention, a repeater system (e.g., system 800) may provide for a VDSL2 technology to be backward compatible with ADSL and ADSL2+ in all data management and error correction respects, which may provide compatible negotiation for bandwidth allocation to virtual connections over all the technologies. In a certain embodiment of the invention, a system (e.g. system 800) is provided for distribution of high data rate traffic over several parallel low data rate paths. System 800 may include, a VDSL2 source 805, HPF 810, IFE 815, CPE 820, glue logic 825, CO 830, card control devices 835a-b, IFEs 840a-n, HPFs 845a-n, line pairs 850, HPFs 855a-n, IFEs 860a-n, CPEs 865a-n, glue logic 870a-n, CO 875, IFE 880, HPF 885, and VDSL2 output 890 according to one embodiment of the invention. System 800 may be configured as essentially two repeater functions connected in tandem according to one embodiment of the invention.

In a further embodiment of the invention, ATM virtual connection software driving a CO device will assign an outgoing virtual connection address for each incoming connection as normal. A further software layer may assign an number of outgoing physical paths for each virtual outgoing connection. For example, system 800 may provide for three outgoing physical paths to be assigned. The traffic may be distributed over the three physical paths by one of two possible means. Each virtual connection may consist of separate virtual calls each having a set of priority, latency, and error correction requirements, and consisting of a numbered sequence of IP packets or ATM cells. In one embodiment of the invention, the first traffic distribution method may assign particular virtual calls to physical paths, and the second method may assign the cells or packets to whichever physical path has available capacity at the instant. The second method may provide a more even distribution of traffic, while the first method may provide more consistent traffic characteristics for each virtual call in terms of latency and priority. At the destination repeater, the three incoming physical broadband paths of each virtual connection may be separated from their companion POTS connections, and each may be received by a separate physical CPE function. The received cells or packets may be passed from the CPE function to the CO chip by means of the glue logic. A software layer in the CO control program, may recognize that the three physical paths belong to a single virtual connection, and will re-assemble the original data stream by applying the required priority and latency parameters to the separate virtual calls or by ordering the cells or packets of the different virtual calls using their sequence numbers. Required error correction calculations may then be applied, and the resulting virtual connection may be assigned to the appropriate physical broadband connection and physically switched to combine with the original single POTS call.

According to an additional embodiment of the invention, a single CPE function of the higher bandwidth incoming physical path may be connected by means of suitable glue logic to a CO chip of a lower bandwidth technology. The number of outgoing physical paths of the lower bandwidth technology used for the single virtual connection may be determined based on the relative bandwidth capabilities and the error free distance required. The present invention is an improvement over existing systems in that the range of very high capacity broadband transmissions over copper pairs may be enhanced indefinitely by the installation of a sequence of equipments according to the invention embodiments herein described.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method to extend transmission range of a digital subscriber line (DSL) comprising:
    receiving via an input subscriber line an input signal including a broadband data signal having a first signal strength and a telecommunication signal;
    separating the broadband data signal from the telecommunication signal;
    regenerating the broadband data signal by embedded error correction code, the embedded error correction code being used to correct signal errors associated with signal attenuation;
    providing forward error correction encoding for the regenerated broadband signal, the forward error correction encoding being usable to correct signal errors associated with signal attenuation;
    amplifying the regenerated broadband data signal to have a second signal strength which is greater than said first signal strength;
    merging the regenerated and amplified broadband data signal with said telecommunication signal into an output signal, wherein the amplified broadband data signal is assigned to one or more subscriber lines with available capacity; and
    transmitting the output signal over an output subscriber line.

2. The method of claim 1, wherein the input signal is embedded in one or more pairs of lines.

3. The method of claim 2, further comprising cross connect switching said one or more pairs of lines to a free regeneration function.

4. The method of claim 3, further comprising identifying local control messages received in a previously regenerated input signal to control said switching.

5. The method of claim 1, further comprising providing an open loop simulation of a subscriber device to the input signal.

6. The method of claim 1, wherein said merging further comprises merging the regenerated broadband data signal with said telecommunication signal into the output signal using a switch matrix.

7. The method of claim 1, further comprising providing a glue logic function.

8. The method of claim 1, further comprising configuring customer premise equipment (CPE) to perform said regenerating.

9. The method of claim 1, further comprising negotiating an optimum data transfer rate.

10. The method of claim 1, wherein the DSL is configured to support one or more of ADSL, ADSL2+, VDSL, VDSL2, HDSL, SDSL and DSL technologies.

11. The method of claim 1, wherein the second signal strength is approximately equal to an original transmitted signal strength.

12. A digital subscriber line (DSL) repeater with extended transmission range comprising:
    a primary operational component electrically coupled to a first subscriber line;
    a secondary operational component electrically coupled to a second subscriber line;
    said primary operational component, configured to:

receive an input signal including a broadband data signal having a first signal strength and a telecommunication signal;

separate the broadband data signal from the telecommunication signal;

regenerate the broadband data signal by embedded error correction code to produce a regenerated broadband data signal having a second signal strength which is greater than said first signal strength, the embedded error correction code being used to correct signal errors associated with signal attenuation; and amplify the regenerated broadband data signal to have a second signal strength which is greater than said first signal strength; and said secondary operational component electrically coupled to the primary component, wherein the secondary component is configured to:

insert forward error correction encoding into the regenerated broadband data signal, the forward error correction encoding being usable to correct signal errors associated with signal attenuation, merge the regenerated broadband data signal with said telecommunication signal into an output signal and transmit the output signal over said second subscriber line, and assign the regenerated broadband data signal to one or more subscriber lines with available capacity.

13. The DSL repeater of claim 12, wherein the DSL repeater corresponds to one or more of a single line repeater, a two line repeater and multiple pair repeater.

14. The DSL repeater of claim 12, wherein said first subscriber line further comprises two pairs of lines electrically coupled as a bonded pair.

15. The DSL repeater of claim 12, wherein said secondary operational component electrically is coupled to a plurality of primary operation components.

16. The DSL repeater of claim 12, further comprising a housing and a backplane supporting a printed circuit board connection with said first subscriber line and said second subscriber line.

17. The DSL repeater of claim 12, further comprising a power supply corresponding to one or more of local 120-240 volt AC power, central office power using spare copper pairs, derived power from central office power, local DC power and an integrated power supply.

18. The DSL repeater of claim 12, further comprising a glue logic function configured to provide interface conversions between the primary operational component and the secondary operational component.

19. The DSL repeater of claim 12, wherein the primary operational component corresponds to customer premise equipment and is further configured to provide one or more of a line driver, analog front end, a hybrid function for separating downstream and upstream data flows, analog-to-digital converter, digital-to-analog converter, message regeneration by error correction computation, message assembly, buffering functions and a type I Universal Testing Operation Interface for Asynchronous Transfer Mode (Utopia) interface towards glue logic.

20. The DSL repeater of claim 12, wherein the secondary operational component corresponds to a central office function and is further configured to provide one or more of internet protocol address recognition, virtual connection management, error correction code generation computation, a hybrid function for separating downstream and upstream data flows, analog front end, analog-to-digital converter, digital-to-analog converter, SRAM memory, message assembly, buffering functions and a type I/II Utopia interface towards glue logic.

21. The DSL repeater of claim 12, further configured to support one or more of ADSL, ADSL2+, VDSL, VDSL2, HDSL, SDSL and a DSL technology.

22. The DSL repeater of claim 12, wherein the second signal strength is approximately equal to an original transmitted signal strength.

23. The DSL repeater of claim 12, further comprising a cross connect switch configured to electrically couple one or more pairs of lines to said primary operational component.

24. The DSL repeater of claim 12, further comprising a cross connect switch configured to merge said output signal of said secondary operational component with one or more pairs of lines.

25. The DSL repeater of claim 12, wherein said secondary operational component is further configured to identify local control messages received in a previously regenerated input signal for switch control.

26. The DSL repeater of claim 12, further comprising an initialization path electrically coupling said input signal to said primary operational component.

27. The DSL repeater of claim 12, further comprising a cut though connection electrically coupling an input line pair to an output line pair, wherein said input line pair does not include a broadband data signal.

28. A system to extend transmission range of a digital subscriber line (DSL) comprising:

a plurality of input subscriber lines, one or more of the input subscriber lines to provide a telecommunication signal only, one or more of the input subscriber lines to provide a broadband data signal having a first signal strength and one or more of the input subscriber lines to provide a combination signal comprised of said broadband data signal with the telecommunication signal;

a primary repeater component configured to separate the broadband data signal from one or more of the combination signals, and to regenerate said broadband data signal by embedded error correction code, the embedded error correction code being used to correct signal errors associated with signal attenuation, and to amplify the regenerated broadband data signal to have a second signal strength which is greater than said first signal strength;

a secondary repeater component configured to:

insert forward error correction encoding into the regenerated broadband data signal, the forward error correction encoding being usable to correct signal errors associated with signal attenuation, distribute the regenerated broadband data signal over a plurality of output subscriber lines, assign the regenerated broadband data signal to one or more of a particular lower rate subscriber lines with available capacity; and subscriber equipment electrically coupled to at least one of the output subscriber lines.

29. The system of claim 28, wherein the plurality of output subscriber lines are of a lower rate.

30. The system of claim 28, wherein the primary repeater component further comprises a customer premise equipment function configured to regenerate the broadband data signal.

31. The system of claim 28, wherein the primary repeater component further comprises a glue logic interface.

32. The system of claim 28, wherein the primary repeater component further comprises cross connect switching an input subscriber line to said secondary repeater component.

33. The system of claim 28, wherein the secondary repeater component is further configured to merge said separated telecommunications signal with one of the plurality of output subscriber lines.

34. The system of claim 28, further comprising a housing and a backplane supporting a printed circuit board (PCB) connection to the subscriber lines.

35. The system of claim 28, wherein the secondary repeater component further comprises a glue logic function associated with the plurality of lower rate subscriber lines.

36. The system of claim 28, wherein the system is configured to support one or more of ADSL, ADSL2+, VDSL, VDSL2, HDSL and any DSL technology.

37. A system to extend transmission range of a digital subscriber line (DSL) comprising:
   a plurality of input subscriber lines, one or more of the input subscriber lines to provide a telecommunication signal only, one or more of the input subscriber lines to provide a broadband data signal having a first signal strength and one or more of the input subscriber lines to provide a combination signal comprised of said broadband data signal with the telecommunication signal;
   a primary repeater component configured to separate the broadband data signal from the combination signal, and to regenerate said broadband data signal by embedded error correction code, the embedded error correction code being used to correct signal errors associated with signal attenuation, and to amplify the regenerated broadband data signal to have a second signal strength which is greater than said first signal strength;
   a secondary repeater component configured to:
   insert forward error correction encoding into the regenerated broadband data signal, the forward error correction encoding being usable to correct signal errors associated with signal attenuation, merge the regenerated broadband data signal from a plurality of lower rate subscriber lines onto a single output subscriber line, assign the regenerated broadband data signal to one or more subscriber lines with available capacity; and
   subscriber equipment electrically coupled to the output subscriber line.

38. The system of claim 37, wherein the primary repeater component further comprises a customer premise equipment function configured to regenerate the broadband data signal.

39. The system of claim 37, wherein the secondary repeater component is further configured to merge said separated telecommunication signal from one of the plurality of input subscriber lines to the single output subscriber line.

40. The system of claim 37, wherein the primary repeater component further comprises a glue logic interface.

41. The system of claim 37, wherein the primary repeater component further comprises cross connect switching from the input subscriber lines to the secondary repeater function.

42. The system of claim 37, wherein the secondary repeater component is further configured to re-assemble said broadband data signal from a plurality of incoming broadband data signals by applying one or more of priority and latency parameters, and ordering by sequence numbers.

43. The system of claim 37, further comprising a housing and a backplane supporting a printed circuit board (PCB) connection to the subscriber lines.

44. The system of claim 37, wherein the secondary repeater component further comprises a glue logic function associated with the plurality of lower rate subscriber lines.

45. The system of claim 37, wherein the secondary repeater component further comprises a central office function configured to merge the regenerated broadband signal.

46. The system of claim 37, wherein the system is configured to support one or more of ADSL, ADSL2+, VDSL, VDSL2, HDSL and any DSL technology.

\* \* \* \* \*